(12) United States Patent
Anglin

(10) Patent No.: US 9,932,859 B2
(45) Date of Patent: Apr. 3, 2018

(54) LUBRICATING FLUID DAMPED ANTI-ROTATIONAL SYSTEMS

(71) Applicant: United Technologies Corporation, Hartford, CT (US)

(72) Inventor: Christopher T. Anglin, Manchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 312 days.

(21) Appl. No.: 14/660,516

(22) Filed: Mar. 17, 2015

(65) Prior Publication Data

US 2015/0354407 A1 Dec. 10, 2015

Related U.S. Application Data

(60) Provisional application No. 61/977,827, filed on Apr. 10, 2014.

(51) Int. Cl.
| | |
|---|---|
| *F01D 25/18* | (2006.01) |
| *F16N 7/00* | (2006.01) |
| *F16D 41/12* | (2006.01) |
| *F01M 1/08* | (2006.01) |

(52) U.S. Cl.
CPC ............. *F01D 25/18* (2013.01); *F16D 41/12* (2013.01); *F16N 7/00* (2013.01); *F01M 1/08* (2013.01); *F05D 2220/32* (2013.01); *F05D 2260/98* (2013.01); *F05D 2270/116* (2013.01)

(58) Field of Classification Search
CPC .......... F16D 41/12; F16D 41/16; F16D 41/02; F16D 23/10; F16D 65/02; F05D 2270/116; F05D 2260/90; F05D 2260/96; F05D 2260/98; F16H 57/0427; F02C 7/36; F16F 15/36; F16C 7/00
See application file for complete search history.

(56) References Cited

U.S. PATENT DOCUMENTS

| | | | |
|---|---|---|---|
| 3,197,001 A | | 7/1965 | Clements |
| 3,444,896 A | * | 5/1969 | Van Der Veer ........ G05B 19/46 137/624.2 |
| 3,899,060 A | | 8/1975 | Clements |
| 4,167,988 A | * | 9/1979 | Acampora ........... H01H 3/3021 185/40 R |

(Continued)

FOREIGN PATENT DOCUMENTS

| | | | |
|---|---|---|---|
| FR | 2949246 | 2/2011 | |
| GB | 805441 A | * 12/1958 | ............. F16D 23/10 |

(Continued)

OTHER PUBLICATIONS

Extended European Search Report dated Sep. 7, 2015 in European Application No. 15162158.8.

*Primary Examiner* — Daniel D Yabut
(74) *Attorney, Agent, or Firm* — Snell & Wilmer L.L.P.

(57) ABSTRACT

A lubricating fluid damped anti-rotational system is provided comprising a pawl carrier having an axis of rotation and a radial aperture, a pawl pivotably mounted to the pawl carrier on a pivot joint, the pawl having a contact portion and a counterweight portion, a lubricating fluid jet configured to propel a lubricating fluid through the radial aperture toward the contact portion.

12 Claims, 7 Drawing Sheets

(56) References Cited

U.S. PATENT DOCUMENTS

| | | | | |
|---|---|---|---|---|
| 5,597,057 A * | 1/1997 | Ruth | ................. | F16D 41/12 |
| | | | | 188/82.8 |
| 2002/0084149 A1 * | 7/2002 | Heuver | ................. | B60T 1/005 |
| | | | | 188/69 |
| 2008/0127772 A1 * | 6/2008 | Sauter | ................. | B60T 1/005 |
| | | | | 74/575 |

FOREIGN PATENT DOCUMENTS

| JP | S57161326 | 10/1982 |
|---|---|---|
| JP | 2008223704 | 9/2008 |

* cited by examiner

US 9,932,859 B2

LUBRICATING FLUID DAMPED ANTI-ROTATIONAL SYSTEMS

CROSS-REFERENCE TO RELATED APPLICATIONS

This application is a nonprovisional of, and claims priority to, and the benefit of U.S. Provisional Application No. 61/977,827, entitled "LUBRICATING FLUID DAMPED ANTI-ROTATIONAL SYSTEMS," filed on Apr. 10, 2014, which is hereby incorporated by reference in its entirety.

FIELD

The present disclosure relates to lubricating fluid damped anti-rotational systems and methods, and more specifically, to lubricating fluid damped anti-rotational systems and methods applicable to turbine engines.

BACKGROUND

Turbine engines typically windmill when idle. A turbine engine will often windmill due to wind blowing through the engine. Many times, wind enters through the engine outlet, causing the engine to windmill in reverse. Many turbine engines do not have a feature to prevent the reverse wind milling of the engine or utilize a complex and/or heavy system to accomplish this feature. Moreover, forward wind milling is often desired, for example, to enable the engine to more readily restart in flight. Reverse wind milling is not desired, for example, to reduce wear on the engine when idle. A turbine engine typically has a system to facilitate lubrication of rotating components when idle, but often this system only lubricates the rotating components when the engine is forward wind milling. Thus, reverse wind milling is often not desired.

SUMMARY

A lubricating fluid damped anti-rotational system is provided comprising, a pawl carrier having an axis of rotation and a first radial aperture, a pawl pivotably mounted to the pawl carrier on a pivot joint, the pawl having a contact portion and a counterweight portion, a lubricating fluid jet configured to propel a lubricating fluid through the first radial aperture toward the counterweight portion.

A method comprising, rotating a pawl carrier having an axis of rotation and a radial aperture and a pawl pivotably mounted to the pawl carrier on a pivot joint, the pawl having a contact portion and a counterweight portion, propelling a lubricating fluid through the radial aperture toward the contact portion.

In various embodiments, a stop pin is axially disposed in the pawl carrier and configured to contact the contact portion of the pawl in response to radially inward movement of the pawl. In various embodiments, the radial aperture is radially inward of the stop pin. In various embodiments, the lubricating fluid comprises an oil. In various embodiments, the lubricating fluid jet is configured to propel the lubricating fluid in a pulsed manner. In various embodiments, the lubricating fluid jet is configured to propel the lubricating fluid in a continuous manner. In various embodiments, the lubricating fluid jet is configured to distribute the lubricating fluid to a pawl nut. In various embodiments, a torsion spring is coupled to the pivot joint. In various embodiments, the torsion spring is coupled to the pivot joint to cause the contact portion to rotate radially outward relative to the pawl carrier. In various embodiments, a stop pin is axially disposed in the pawl carrier and configured to contact the contact portion of the pawl in response to radially inward movement of the pawl. In various embodiments, the lubricating fluid damped anti-rotational system further comprises a second radial aperture. In various embodiments, the lubricating fluid comprises an oil. In various embodiments, the lubricating fluid jet is configured to propel the lubricating fluid in a pulsed manner. In various embodiments, the lubricating fluid jet is configured to propel the lubricating fluid in a continuous manner. In various embodiments, the lubricating fluid jet is configured to distribute the lubricating fluid to a pawl nut. In various embodiments, the lubricating fluid damped anti-rotational system further comprises a torsion spring coupled to the pivot joint. In various embodiments, the torsion spring is coupled to the pivot joint to cause the counterweight portion to rotate radially inward relative to the pawl carrier. In various embodiments, the propelling is continuous.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

As used herein, a "lubricating fluid" may refer to a fluid that is suitable for use in lubricating two or more surfaces. For example, a lubricating fluid may reduce friction between two or more contacting surfaces. In various embodiments, a lubricating fluid may comprise an oil, whether the oil is naturally occurring or synthetic.

Figure 1:
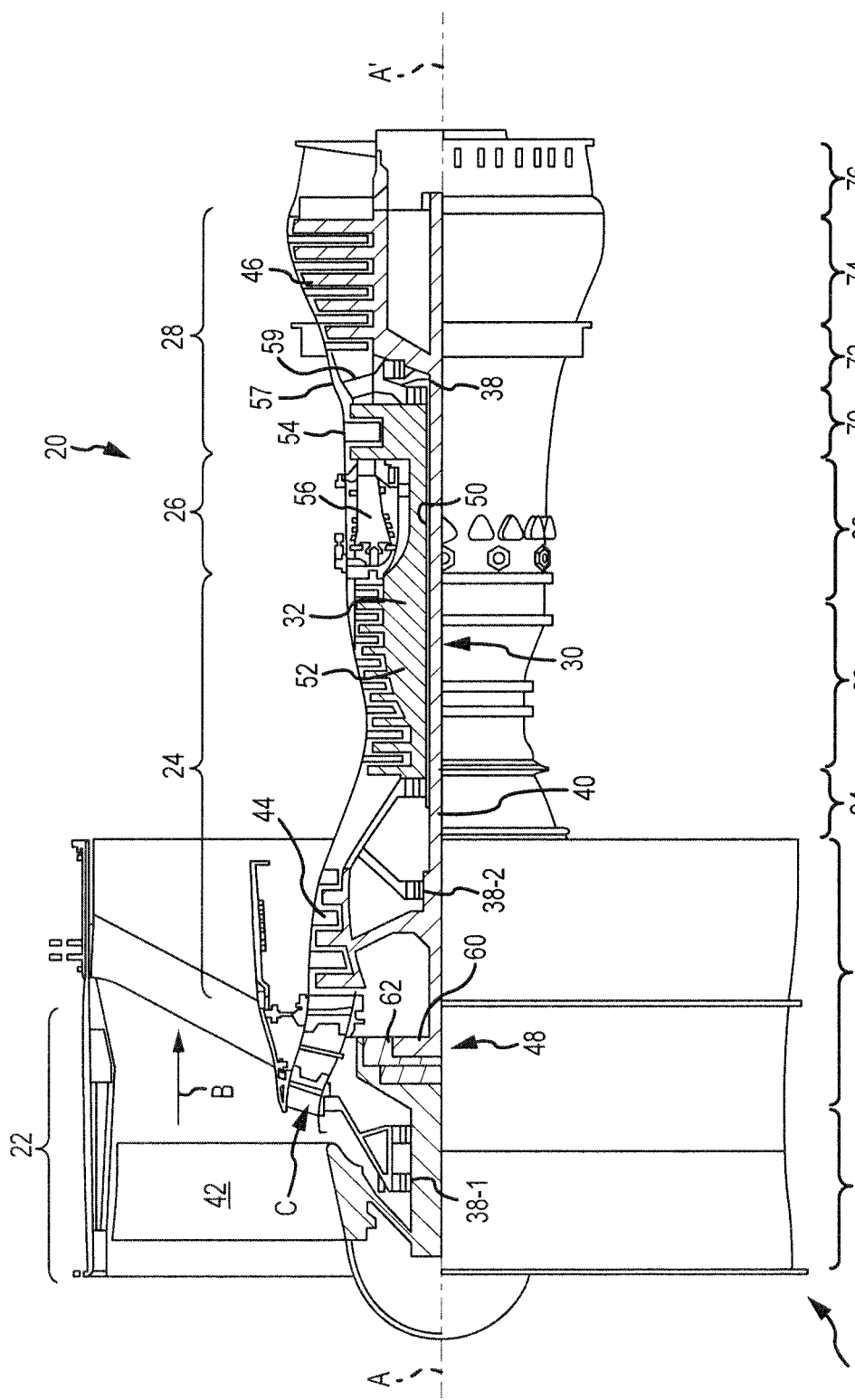
FIG. 1 illustrates a turbofan engine.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

With reference to FIG. 1, gas turbine engine 20 may generally include multiple of modules including for example, a fan case module 61, an intermediate case module 63, a Low Pressure Compressor (LPC) module 64, a High Pressure Compressor (HPC) module 66, a diffuser module 68, a High Pressure Turbine (HPT) module 70, a mid-turbine frame (MTF) module 72, a Low Pressure Turbine (LPT) module 74, and a Turbine Exhaust Case (TEC) module 76.

As described above, an anti-rotational device may be used to prevent reverse wind-milling in a turbofan engine. In particular, an anti-rotational device may be disposed in the low pressure turbine to prevent rotation in an undesired direction. For example, an anti-rotational device may be configured to allow rotation in a first direction (e.g., clockwise) and to limit all or nearly all rotation in a second direction (e.g., counter clockwise). Moreover, an anti-rotational device may be configured to limit mechanical contact at or above certain angular velocities. In that regard, lower angular velocities may be associated with a level of mechanical contact between various components but, after a low pressure turbine achieves a given angular velocity, the contact may be reduced or eliminated. However, such anti-rotational device may exhibit undesired vibration, for example, when rotation proceeds at an angular velocity below a predetermined angular velocity.

Figure 2A:
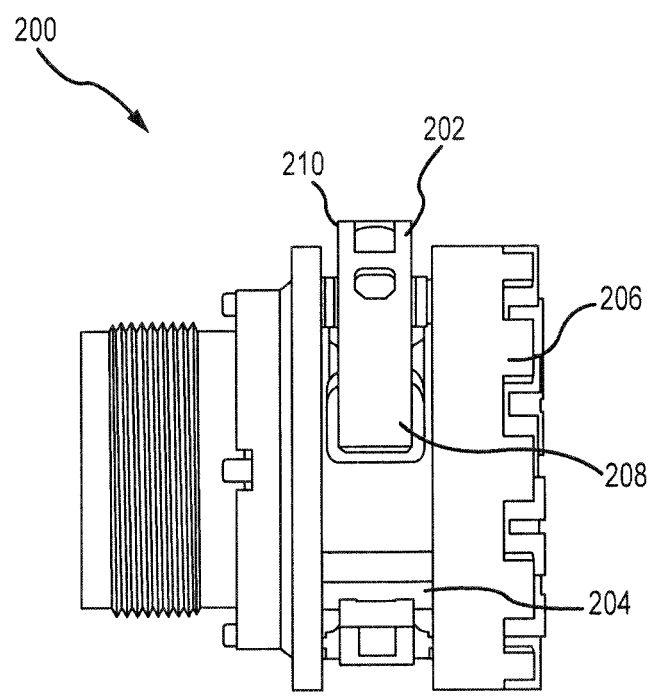
FIGS. 2A and 2B illustrate a pawl carrier according to various embodiments.
Figure 2B:
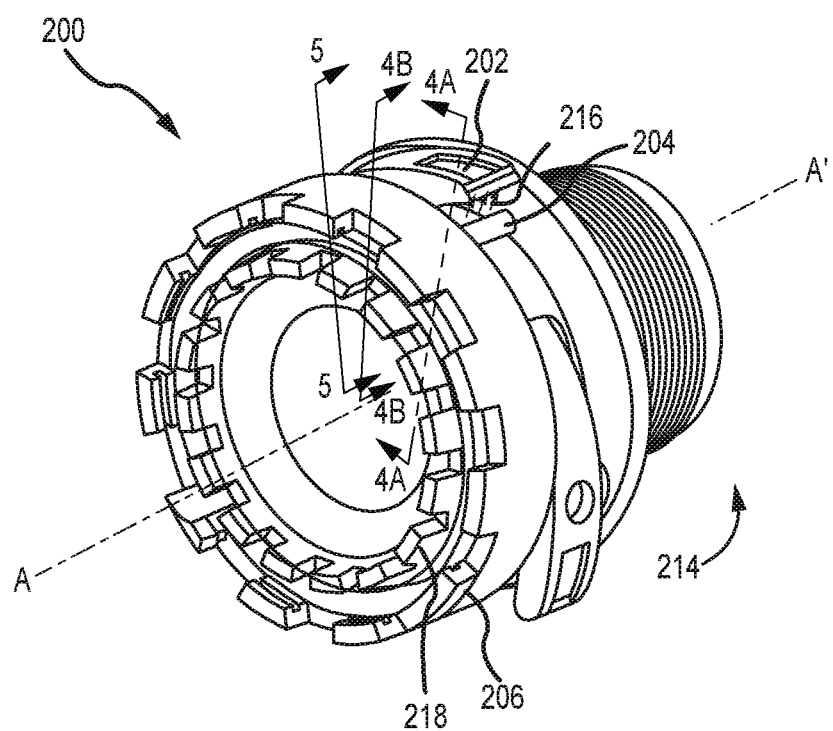

With reference to FIGS. 2A and 2B, pawl system 200 is shown. Pawl carrier 206 is shown coupled to pawl 202. Stop pin 204 is shown disposed in pawl carrier 206. Pawl carrier 206 may comprise any number of pawls, for example, from 1 pawl to 20 pawls. Pawl nut 218 coupled pawl carrier 206 to a low pressure turbine shaft, which drives rotation of pawl carrier 206. In various embodiments, any number of pawls may be used, and thus the selection of the appropriate number of pawls and the spacing of the pawls may be tuned in response to design weight constraints, footprint, and other manufacturing concerns. In various embodiments, pawl carrier 206 comprises three pawls distributed uniformly about the circumference of pawl carrier 206.

Pawl 202 may be comprised of any suitable material. For example, pawl 202 may be comprised of stainless steel such as 300M stainless steel and/or a chromium-nickel-tungsten martensitic alloy (also known as Greek Ascoloy). In various embodiments, various components disclosed herein may comprise 300M stainless steel and/or chromium-nickel-tungsten martensitic alloy (also known as Greek Ascoloy)

and/or austenitic nickel-chromium-based alloy such as Inconel® which is available from Special Metals Corporation of New Hartford, N.Y., USA, or any other metal, for example, titanium. However, in further embodiments, various components of anti-rotational devices may comprise other metals, such as tungsten, aluminum, steel, or alloys, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of anti-rotational devices as disclosed herein are made of different materials or combinations of materials, and/or may comprise various coatings.

Figure 3A:
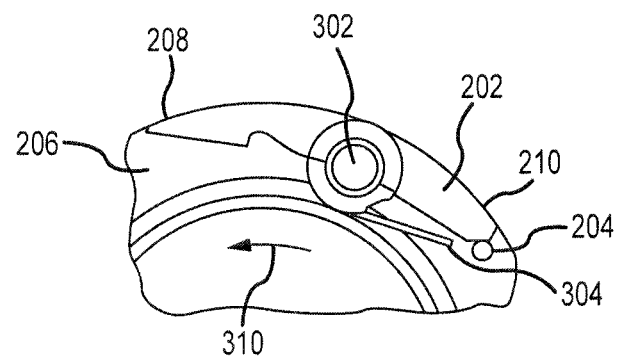
FIGS. 3A and 3B illustrate a pawl and pawl carrier according to various embodiments.

With brief reference to FIG. 3A, pawl 202 is shown pivotably mounted to pawl carrier 206 on a pivot joint 302. Pivot joint 302 allows pawl 202 to rotate freely about pivot joint 302. Pivot joint 302 may comprise any suitable joint that is configured to allow pawl 202 to pivot. For example, a post and bushing mating may be used as pivot joint 302. Pivot joint 302 may be suitably lubricated, for example, using a solid state lubricant and/or liquid lubricant. Pivot joint 302 may also comprise one or more materials that are coated with or comprised of a low friction material. For example, portions of pivot joint 302 may be coated with polytetrafluoroethylene ("PTFE"). In various embodiments, pivot joint 302 is disposed at or near the geometric center of pawl 202.

With continued reference to FIGS. 2A, 2B and 3A, pawl 202 comprises counterweight portion 208 and contact portion 210. Pawl 202 may comprise a single integral piece comprising counterweight portion 208 and contact portion 210. Counterweight portion 208 may be integral to pawl 202 and may be formed by any suitable means, for example, by forging, casting, stamping, negative manufacturing techniques, additive manufacturing techniques and/or other methods of manufacture. Counterweight portion 208 may be configured such that the center of mass of pawl 202 is more proximate a terminus of counterweight portion 208 than a terminus of contact portion 210. Counterweight portion 208 may be configured to have a "scoop" or cut out and/or a portions of greater thickness and/or mass when compared with other portions of pawl 202.

Torsion spring 304 may be disposed to exert a radial outward force upon pawl 202. In that regard, torsion spring 304 exerts a rotational force on pawl 202 that tends to pivot pawl 202 about pivot joint 302 in a radially outward direction. Torsion spring 304 may be made from any suitable material, for example, stainless steel.

Figure 3B:
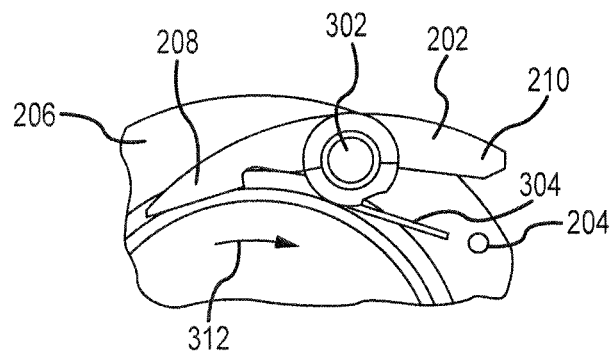

With reference to FIG. 3B, upon rotation in clockwise direction 312, contact portion 210 may be directed radially outward with respect to pawl carrier 206. With reference to FIG. 2B, as pawl carrier 206 rotates in counterclockwise direction 214 at an angular velocity below a predetermined angular velocity, each pawl may contact structures, such as a ratchet, disposed radially outward of pawl carrier 206. In that regard, pawl 202 may periodically be deflected radially inward after contact with other contact structures.

In that regard, a stop pin may be disposed in an axial direction and provide a contact point for pawl 202 and contact portion 210 in particular, to prevent pawl 202 from contacting pawl carrier 206. Thus, stop pin 204 is configured to interact with contact portion 210 in response to radially inward movement of pawl 202.

The contact between pawl 202 and stop pin 204 may cause undesirable vibration. During rotation, it may be desirable to damp the oscillations of pawl 202 about pivot joint 302. In that regard, with reference to FIG. 2B, lubricating fluid stream 216 may be propelled radially outward of pawl carrier 206 and contact or otherwise interact with contact portion 210 of pawl 202. Accordingly, after contact with other contact structures, pawl 202 may be sent radially inward toward stop pin 204. Lubricating fluid stream 216, traveling in a radially outward direction, may contact pawl 202 and oppose pawl 202's radial inward motion. In such a manner and with momentary reference to FIG. 3B, the oscillations of pawl 202 about pivot joint 302 tend to be damped. The flow rate of the lubricating oil, and the timing in which the oil is propelled radially outward, may be adjusted in accordance with a variety of factors.

Figure 4A:
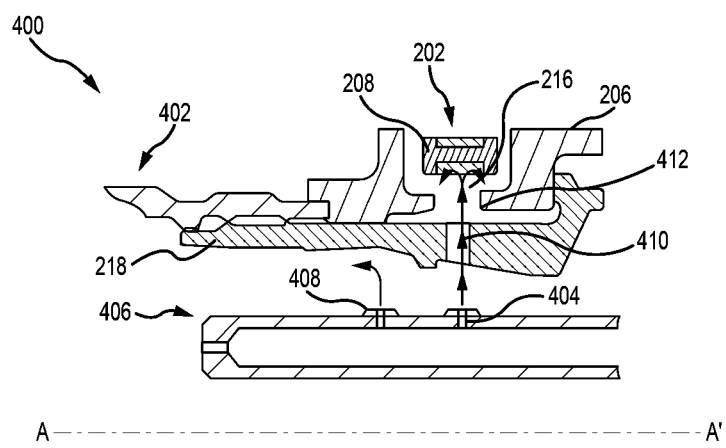
FIGS. 4A and 4B illustrates a lubricating fluid damped pawl carrier in various embodiments.
Figure 4B:
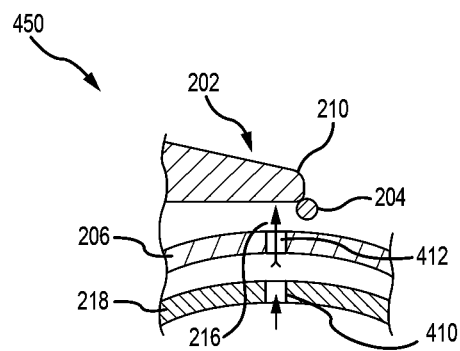

With reference to FIGS. 4A and 4B, cross sectional views 400 and 450 of pawl carrier 206 are shown along the line A-A' shown in FIG. 2B. Line A-A' is disposed such that point A is forward of point A'. Pawl nut 218 is shown coupling low pressure turbine shaft ("LPT shaft") 402 to pawl carrier 206. LPT 402 drives rotation of pawl carrier 206. Pawl 202 and contact portion 210 of pawl 202 is shown proximate pawl carrier 206. Lubricating fluid system 406 is disposed radially inward of pawl carrier 206.

Lubricating fluid system 406 may comprise any suitable system for the distribution and/or propulsion of a lubricating fluid. Lubricating fluid system 406 may comprise a pressurized system that allows a lubricating fluid to escape through one or more apertures (also referred to as orifices). In that regard, a pressurization system may impart pressurization to lubricating fluid system 406. The increase in pressure in lubricating fluid system 406 may thus propel lubricating fluid from lubricating fluid system 406, through an orifice, and away from the lubricating fluid system 406. Pawl nut lubricating aperture 408, for example, may also be part of lubricating fluid system 406. Pawl nut lubricating aperture 408 may be configured to propel and/or distribute lubricating fluid to pawl nut 218.

Lubricating fluid system radial aperture 404 is shown radially inward of pawl carrier 206. Lubricating fluid system radial aperture 404 may comprise any suitable aperture or orifice to allow a lubricating fluid to be conducted away from lubricating fluid system 406, for example, in a radially outward manner. As lubricating fluid stream 216 is propelled radially outward from lubricating fluid system 406, lubricating fluid stream 216 passes through pawl nut radial aperture 410. Pawl nut radial aperture 410 may be any aperture or orifice that may allow a lubricating fluid to travel radially outward. In like manner, lubricating fluid stream 216 passes through pawl carrier radial aperture 412. Pawl carrier radial aperture 412 may be any aperture or orifice that may allow a lubricating fluid to travel radially outward.

Lubricating fluid stream 216 may then contact the contact portion 210 of pawl 202. Lubricating fluid stream 216 travels in a radially outward direction. In that regard, lubricating fluid stream 216 may oppose the radially inward motion of pawl 202, such as the radially inward motion caused by contact with a contact structure.

With reference to FIG. 4B, stop pin 204 is shown in contact with contact portion 210 of pawl 202. Pawl carrier radial aperture 412 is shown proximate to and radially inward of stop pin 204.

Figure 5:
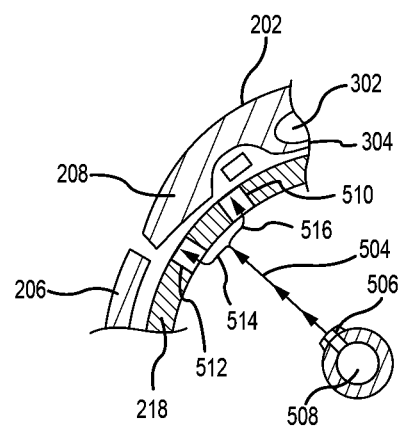
FIG. 5 illustrates a lubricating fluid damped pawl carrier in various embodiments.

In various embodiments, lubricating fluid damping may be of benefit with respect to counterweight portion 208 of pawl 202. With reference to FIG. 5, cross sectional view 500 of pawl carrier 206 are shown along the line A-A' shown in FIG. 2B. Line A-A' is disposed such that point A is forward of point A'. Lubricating fluid system 508 is disposed radially inward of pawl carrier 206.

Lubricating fluid system 508 may comprise any suitable system for the distribution and/or propulsion of a lubricating fluid. Lubricating fluid system 508 may comprise a pressurized system that allows a lubricating fluid to escape through one or more apertures (also referred to as orifices). In that regard, a pressurization system may impart pressurization to lubricating fluid system 508. The increase in pressure in lubricating fluid system 508 may thus propel lubricating fluid from lubricating fluid system 508, through an orifice, and away from the lubricating fluid system 508.

Lubricating fluid system radial aperture 506 is shown radially inward of pawl carrier 206. Lubricating fluid system radial aperture 506 may comprise any suitable aperture or orifice to allow a lubricating fluid to be conducted away from lubricating fluid system 508, for example, in a radially outward manner. As lubricating fluid stream 504 is propelled radially outward from lubricating fluid system 508, lubricating fluid stream 504 passes through first pawl nut radial aperture 510 and second pawl nut radial aperture 512 in pawl nut 218. First pawl nut radial aperture 510 and second pawl nut radial aperture 512 may be any aperture or orifice that may allow a lubricating fluid to travel radially outward.

Lubricating fluid stream 504 travels in a radially outward direction. Lubricating fluid stream 504 may branch into lubricating fluid stream 514 and lubricating fluid stream 516. In that regard, lubricating fluid stream 514 may pass through second pawl nut radial aperture 512 and lubricating fluid stream 516 may pass through first pawl nut radial aperture 510.

Lubricating fluid stream 514 and/or lubricating fluid stream 516 may then contact the counterweight portion 208 of pawl 202. In that regard, lubricating fluid stream 514 and/or lubricating fluid stream 516 may oppose the radially inward motion of counterweight portion 208 of pawl 202, such as the radially inward motion caused by the torsion spring 304.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lubricating fluid damped anti-rotational system comprising:
    a pawl carrier having an axis of rotation and a first radial aperture, the pawl carrier coupled to a shaft configured to rotate about the axis of rotation;
    a pawl pivotably mounted to the pawl carrier on a pivot joint, the pawl having a contact portion and a counterweight portion,
    wherein the first radial aperture is disposed within the pawl carrier and configured to distribute a lubricating fluid jet radially outward toward the contact portion of the pawl; and
    a pawl nut connected to the shaft and to the pawl carrier, the pawl nut disposed radially inward of the pawl carrier and including a second radial aperture in fluid communication with the first radial aperture.

2. The lubricating fluid damped anti-rotational system of claim 1, further comprising a stop pin axially disposed in the pawl carrier and configured to contact the contact portion of the pawl in response to radially inward movement of the pawl.

3. The lubricating fluid damped anti-rotational system of claim 2, wherein the first radial aperture is positioned radially inward of the stop pin.

4. The lubricating fluid damped anti-rotational system of claim 1, wherein the lubricating fluid comprises an oil.

5. The lubricating fluid damped anti-rotational system of claim 1, further comprising a torsion spring coupled to the pivot joint.

6. The lubricating fluid damped anti-rotational system of claim 5, wherein the torsion spring is coupled to the pivot joint to cause the contact portion to rotate radially outward relative to the pawl carrier.

7. A lubricating fluid damped anti-rotational system comprising:
    a shaft configured to rotate about an axis of rotation;
    a pawl carrier having an axis of rotation and a first radial aperture, the pawl carrier rotatably coupled to the shaft;
    a pawl nut connected to the shaft and to the pawl carrier, the pawl nut disposed radially inward of the pawl carrier and including a second radial aperture in fluid communication with the first radial aperture; and a pawl pivotably mounted to the pawl carrier on a pivot joint, the pawl having a contact portion and a counterweight portion, wherein the first radial aperture is disposed within the pawl carrier and configured to distribute a lubricating fluid jet radially outward toward the contact portion of the pawl.

8. The lubricating fluid damped anti-rotational system of claim 7, further comprising a stop pin axially disposed in the pawl carrier and configured to contact the contact portion of the pawl in response to radially inward movement of the pawl.

9. The lubricating fluid damped anti-rotational system of claim 7, wherein the lubricating fluid comprises an oil.

10. The lubricating fluid damped anti-rotational system of claim 7, further comprising a lubricating fluid system having a third aperture in fluid communication with the second aperture.

11. The lubricating fluid damped anti-rotational system of claim 7, further comprising a torsion spring coupled to the pivot joint.

12. The lubricating fluid damped anti-rotational system of claim 11, wherein the torsion spring is coupled to the pivot joint to cause the counterweight portion to rotate radially inward relative to the pawl carrier.

\* \* \* \* \*